(12) United States Patent
Klapp et al.

(10) Patent No.: US 12,163,838 B2
(45) Date of Patent: Dec. 10, 2024

(54) HYPERSPECTRAL SCANNER

(71) Applicant: THE STATE OF ISRAEL, MINISTRY OF AGRICULTURE AND RURAL DEVELOPMENT, AGRICULTURAL RESEARCH ORGANIZATION (ARO) (VOLCANI CENTER), Rishon Lezion (IL)

(72) Inventors: Iftach Klapp, Modiin-Macabim-Reut (IL); Or Arad, Shimshit (IL)

(73) Assignee: The State of Israel, Ministry of Agriculture & Rural Development Agricultural Research Organization (ARO), Rishon Lezion (IL)

( * ) Notice: Subject to any disclaimer, the term of this patent is extended or adjusted under 35 U.S.C. 154(b) by 955 days.

(21) Appl. No.: 17/266,669

(22) PCT Filed: Aug. 5, 2019

(86) PCT No.: PCT/IB2019/056635
§ 371 (c)(1),
(2) Date: Feb. 8, 2021

(87) PCT Pub. No.: WO2020/031054
PCT Pub. Date: Feb. 13, 2020

(65) Prior Publication Data
US 2021/0318169 A1 Oct. 14, 2021

Related U.S. Application Data

(60) Provisional application No. 62/714,780, filed on Aug. 6, 2018.

(51) Int. Cl.
*G01J 3/28* (2006.01)
*G01J 3/02* (2006.01)
(Continued)

(52) U.S. Cl.
CPC ............. *G01J 3/2823* (2013.01); *G01J 3/027* (2013.01); *G01J 3/14* (2013.01); *G01J 3/2803* (2013.01);
(Continued)

(58) Field of Classification Search
CPC ............. G01J 3/2823; G01J 2003/2826; G01J 3/2803; G01J 3/14; G01J 3/027; G01J 3/0205; G01S 17/89; G02B 26/108
(Continued)

(56) References Cited

U.S. PATENT DOCUMENTS 7,274,815 B1 * 9/2007 Smithpeter .......... G06V 10/145
382/154
7,363,157 B1 * 4/2008 Hanna .................... G01C 11/00
702/5
(Continued)

FOREIGN PATENT DOCUMENTS

DE 102014106974 A1 11/2015
WO 2017156400 A1 9/2017

OTHER PUBLICATIONS

Dixon et al., Risley Prism Universal Pointing System (RPUPS), Novel Optical Systems Design and Optimization XVIII, edited by G. Groot Gregory, Arthur J. Davis, Cornelius F. Hahlweg Proc. of SPIE vol. 9579, 95790B, 2015, 6 pp. (Year: 2015).*
(Continued)

*Primary Examiner* — Daniel L Murphy
(74) *Attorney, Agent, or Firm* — Rivka Friedman (57) ABSTRACT

The present invention provides a scanning system including a chamber configured for receiving reflected light from an object. The chamber includes a first prism and a second prism configured for refracting the reflected light, at least one beam splitter configured for splitting the reflected light into a first beam and a second beam, a camera configured for
(Continued)

receiving the first beam so as to provide images of the object, a condenser lens configured for condensing the second beam, and a spectrometer configured for receiving the condensed second beam and provide a spectrum analysis of the second beam. The system further includes a particular computer configured to combine the images of the object produced by the camera with the spectrum analysis produced by the spectrometer to provide a hyperspectral image.

15 Claims, 8 Drawing Sheets

(51) Int. Cl.
    *G01J 3/14*     (2006.01)
    *G01S 17/89*     (2020.01)

(52) U.S. Cl.
    CPC ....... *G01S 17/89* (2013.01); *G01J 2003/2826* (2013.01)

(58) Field of Classification Search
    USPC ........................................................ 356/4.01
    See application file for complete search history.

(56) References Cited

U.S. PATENT DOCUMENTS

| | | | |
|---|---|---|---|
| 9,299,731 B1 * | 3/2016 | Lenius | G01S 17/06 |
| 9,791,555 B2 * | 10/2017 | Zhu | G01S 17/10 |
| 2011/0032507 A1 | 2/2011 | Braunecker et al. | |
| 2012/0170029 A1 * | 7/2012 | Azzazy | G01S 17/66 |
| | | | 356/139.04 |
| 2014/0300806 A1 | 10/2014 | Pollock et al. | |
| 2016/0138974 A1 | 5/2016 | Silny | |
| 2018/0197052 A1 * | 7/2018 | Yanson | G06K 19/06037 |
| 2018/0350086 A1 * | 12/2018 | Sweet, III | G01C 15/002 |

OTHER PUBLICATIONS

Translation of description of Jung et al., DE102014106974, 2014, 22. pp. created Mar. 5, 2024. (Year: 2024).*
Translation of claims of Jung et al., DE102014106974, 2014, 6. pp. created Mar. 5, 2024. (Year: 2024).*
Translation of abstract of Jung et al., DE102014106974, 2014, 2. pp. created Mar. 5, 2024. (Year: 2024).*
International Search Report for PCT/IB2019/056635 Mailed on Nov. 19, 2019.
Examination Report for Indian Patent Application No. 202117004189 Mailed on May 17, 2022.
Extended European Search Report for EP Application No. 19847532.9 Mailed on Jul. 13, 2021.
Dixon John et al. "Risley prism universal pointing system (RPUPS)" Proceedings of SPIE, IEEE, US, vol. 9579, Sep. 3, 2015, p. 95790B, XP060059946, DOI: 10.1117/12.2188088, ISBN: 978-1-62841-730-2.

* cited by examiner

HYPERSPECTRAL SCANNER

CROSS-REFERENCES TO RELATED APPLICATIONS

This application is related to and claims priority from commonly owned U.S. Provisional Patent Application Ser. No. 62/714,780, entitled: Low cost HyperSpectral Scanner, filed on Aug. 6, 2018, the disclosure of which is incorporated by reference in its entirety herein.

TECHNICAL FIELD

The present invention relates to the field of hyperspectral scanners.

BACKGROUND OF THE INVENTION

Hyperspectral imaging, like other spectral imaging, collects and processes information from across the electromagnetic spectrum. The goal of hyperspectral imaging is to obtain the spectrum for each pixel in the image of a scene, with the purpose of finding objects, identifying materials, or detecting processes.

Hyperspectral imaging combines spatial and detailed spectral information of a scene to construct images where the full spectrum of light at each pixel is known. Commercial hyperspectral imaging technology is used, for example, in the food industry, agriculture, astronomy, molecular biology, biomedical imaging, geosciences, physics, and surveillance.

To date, hyperspectral scanners are composed of scanning mirrors, however, scanning mirrors suffer from wear especially in conditions of measuring above a field while subjected to wind and/or dust.

SUMMARY OF THE INVENTION

The present invention provides a system for identifying the condition of an object by analyzing the spectrum of a light reflected from the object, which may include emitted light generated by internal light conversion such as fluorogenic process, and generating a hyperspectral cube of the object. The scanning system comprises: a chamber configured for receiving reflected light from an object, the chamber includes: a first prism and a second prism configured for refracting the reflected light; at least one beam splitter configured for splitting the reflected light into a first beam and a second beam; a camera configured for receiving the first beam so as to provide images of the object; a condenser lens configured for condensing the second beam; and, a spectrometer configured for receiving the condensed second beam and provide a spectrum analysis of the second beam. The system further includes a particular computer configured to combine the images of the object produced by the camera and the spectrum analysis produced by the spectrometer to provide a hyperspectral image.

Optionally, the system additionally comprises a sensor for measuring the distance from the object.

Optionally, the sensor is a light detection and ranging (LIDAR) sensor.

Optionally, the light detection and ranging (LIDAR) sensor provides a range map.

Optionally, the camera is an RGB camera.

Optionally, the spectrometer is a point spectrometer.

Optionally, the hyperspectral image is a hyperspectral cube.

Optionally, the first prism and the second prism are each connected to a rotating mechanism to allow the individual rotation of each wedge prism around its axis.

Optionally, the rotating mechanism is operated manually.

Optionally, the rotating mechanism is operated by a computerized controller.

Optionally, the system additionally comprises a filter configured for limiting illumination.

Optionally, the system additionally comprises an integral radiation meter configured for monitoring radiation from external sources.

Optionally, the system is mounted on one of a tripod, a post, and a tower.

Optionally, the system is mounted on an unmanned aerial vehicle (UAV).

Optionally, the system is stabilized by a gimbal set to prevent hovering errors.

Optionally, the camera and the spectrometer are aligned so as to allow accurate identification of the exact location of the spectrometer's measurements in the generated image.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

"Linked" as used herein, includes both wired and/or wireless links, such that the computers, servers, components, devices and the like, are in electronic and/or data communications with each other, directly or indirectly.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

The present invention is not limited in its application to the details of construction and the arrangement of the components set forth in the following description. The invention is capable of other embodiments, or of being practiced or carried out in various ways. Also, it is to be understood that the phraseology and terminology employed herein is for the purpose of description and should not be regarded as limiting.

The present invention provides a hyperspectral scanning system which replaces the use of scanning mirrors with a mechanism that is based on two or more wedge prisms. The present invention is used to identify the condition of an object by analyzing the spectrum of a light reflected from the object, which may include emitted light generated by internal light conversion such as fluorogenic process, and generating a hyperspectral cube of the object.

Figure 1:
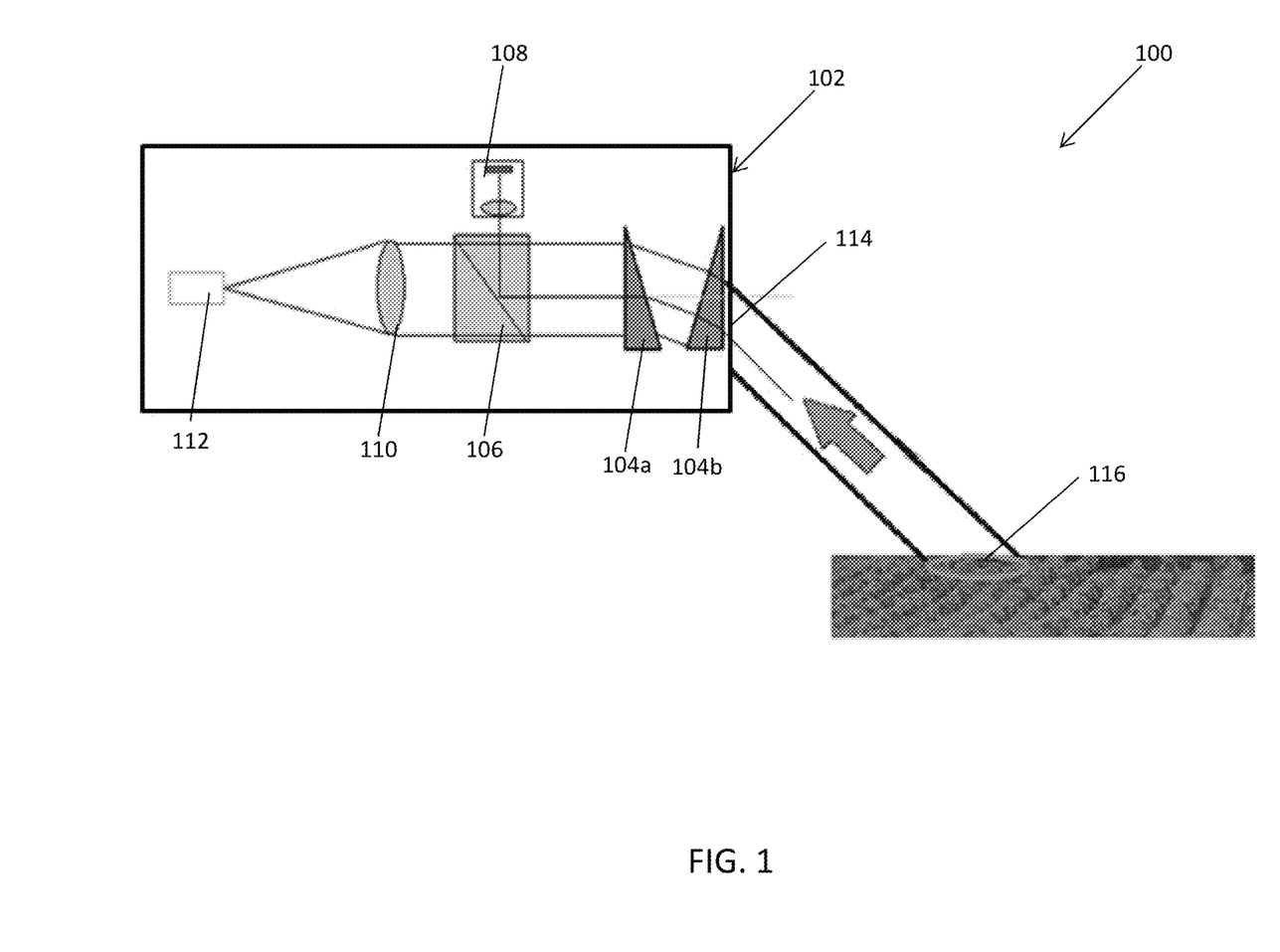
FIG. 1 is a side perspective view of the system according to an embodiment of the present invention.

FIG. 1 is a side perspective view of the system 100. The system 100 includes a chamber 102 enclosing, for example, two prisms 104a-104b, e.g. wedge prisms, a beam splitter 106, a camera 108, a condensing lens 110 and a spectrometer 112, for example, a point spectrometer. The chamber 102 further includes an aperture 114 through which a reflected light field is entered into the system 100. The system 100 is linked to a computer (not shown).

A reflected beam of light from an object 116, for example, a plant in a field is entered into the chamber 102 through the aperture 114. The reflected beam reaches the wedge prisms 104a-104b which in turn refract the beam to direct it into the system 100. Each wedge prism 104a-104b is separately connected, for example, to a rotating mechanism allowing the individual rotation of each wedge prism 104a-104b around its axis. The rotating mechanism can be operated manually or controlled by a computerized controller (not shown), over wired and/or wireless networks, or combinations thereof. The individual rotation of each wedge prism provides the system 100 with two degrees of freedom. The angles combination of the wedge prisms 104a-104b allows the steering of the system's line-of-sight (LOS) to attain a desired line-of-sight (LOS).

Following the prisms 104a-104b, the refracted beam reaches the beam splitter 106. The beam splitter 106 splits the light intensity of the refracted beam into, for example, two separate beams, a first beam directed to the camera 108 and a second beam directed to the spectrometer 112. The second beam directed to the spectrometer 112 passes through the condensing lens 110 which condense the beam before it reaches the spectrometer 112. The spectrometer 112 analyzes the condensed beam and provides a spectrum of the reflected beam, while the camera 108 which is, for example, an RGB (red, green, and blue) camera generates images of the object 116. Both the spectrum of the reflected beam and the generated images of the object 116 are transferred to the computer (not shown) connected to the system 100. The computer provides a spectrum analysis and hyperspectral cube of the object 116.

The RGB camera identifies features of sub-resolution of the hyperspectral resolution which in turn allow the determination of the mixture level of the hyperspectral pixel whenever the spatial resolution is coarser than the region of interest (ROI) and the pixel contains a mixed spectrum of the ROI and its background (mixed pixels). Additionally, since the camera 108 and the spectrometer 112 are aligned, the camera 108 allows accurate identification of the exact location of the spectrometer's measurements in the generated image.

Throughout its operation, the system 100 is calibrated for transmission losses such that each point of measurement is corrected according to the system's transmission at the specific point. The calibration is performed using the formula:

$$\hat{I}(\Theta,\Omega,Z) = F(I_{measure}(\Theta,\Omega,Z), T(\Theta,\Omega,Z)).$$

$\hat{I}$ ($\Theta,\Omega$, Z) is the estimator for the point of radiation in a specific space location, $I_{measure}$ ($\Theta$, $\Omega$, Z) is the system's measurement in that point, and T ($\Theta$, $\Omega$, Z) is the system's transmission in that point.

The calibration may further include the subtracting of ghost imaging, internal reflections etc. and corrections of optical aberrations using, for example, lenses, prisms, splitters, and the like.

The system 100 may further feature a filter (not shown) positioned at the entry of the chamber 102 so as to limit the illumination effect while conducting outdoor measurements, and an integral radiation meter or sensor to monitor the radiation from external sources, such as global radiation from the sun.

The system 100 can be operated on the ground mounted, for example, on a tripod, a post, a tower and the like or it can be assembled on an airplane or unmanned aerial vehicle (UAV). When the system 100 is assembled on an unmanned aerial vehicle or airplane, the system 100 may be stabilized by a gimbal set, for example, a three-axis gimbal set (roll, pitch, and yaw) in which each axis offers a degree of freedom to prevent hovering errors.

In another embodiment, the beam splitting process may be operated by, for example, a fiber optic splitter and the like.

Figure 2:
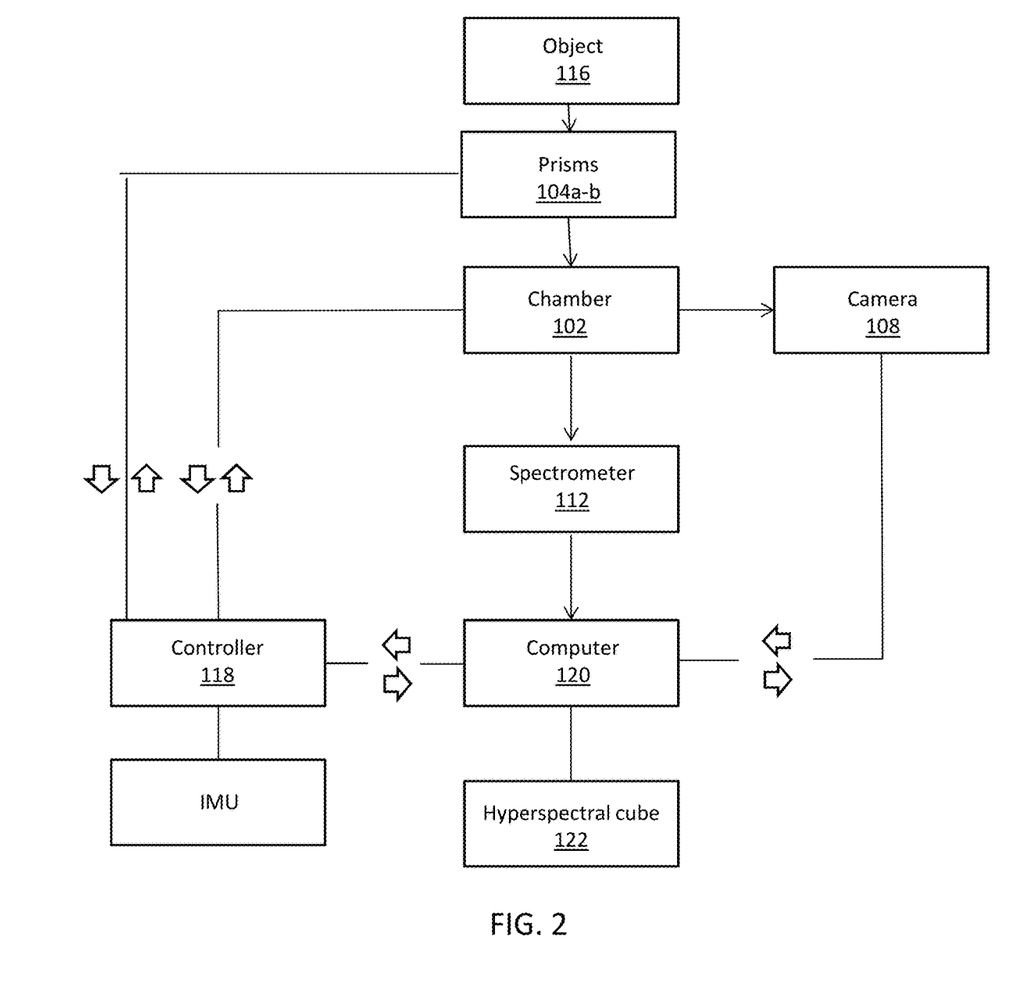
FIG. 2 is a flow chart of the system of FIG. 1.

FIG. 2 is a flow chart of the system 100. A reflected light field from the object 116 is directed by the prisms 104a-104b and transferred through the chamber 102. In the chamber 102, the light is split into, for example, two separate beams, a first beam directed to the camera 108 and a second beam directed to the spectrometer 112. The motion of the chamber 102 to compensate external motion such as unmanned aerial vehicle (UAV) vibration is controlled by a controller 118 connected to an Inertial Measurement Unit (IMU) or other feedback orientation sensors. The chamber motion may also be estimated from changes in the instantaneous field of view of the camera 108.

The controller 118 execute the movement of the prisms 104a-104b according to the scanning plan. Prisms' motion feedback may be controlled through motion indicator such as encoders and may also be estimated from changes in the instantaneous field of view of the camera 108.

The controller 118, which is processor-based, is controlled by a central processing unit (CPU). Programs for running the CPU, as well as programs for causing motion, in response to a motion command, are stored in a storage/memory unit. The CPU is in electronic and/or data communication with a motion module. The motion is carried out according to a scanning plan on a computer 120.

The returned information of the scanning plan, the controller feedback/IMU signal and the recording of the camera images are processed on the computer 120 to calculate the prisms 104a-104b orientation and exact measuring location. Using predetermined information on prism transfer and radiation measurments, the signal is calibrated with the measuring location. The data is then incorporated by the computer 120 to gain a hyperspectral cube 122.

Figure 3:
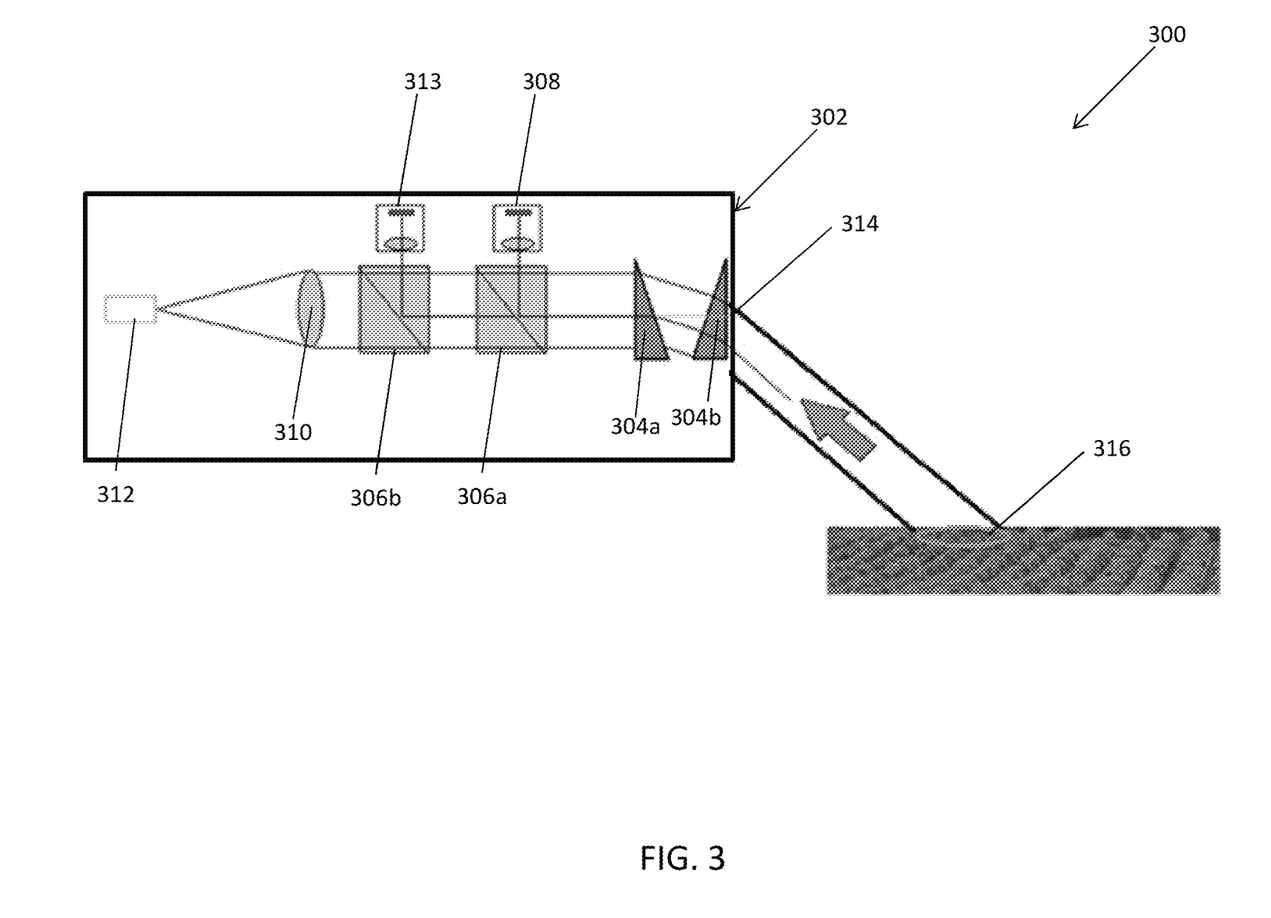
FIG. 3 is a side perspective view of the system according to another embodiment of the present invention.

FIG. 3 is a side perspective view of the system 300. The system 300 is similar in construction and operation to system 100, as detailed above, except where indicated.

The system 300 includes a chamber 302 enclosing, for example, two prisms 304a-304b, e.g. wedge prisms, two beam splitters 306a-306b positioned sequentially to one another, a camera 308, a condensing lens 310, a spectrometer 312, for example, a point spectrometer and a sensor 313, for example, a light detection and ranging (LIDAR) sensor. The chamber 302 further includes an aperture 314 through which a reflected light field is entered into the system 300. The system 300 is linked to a computer (not shown).

A reflected beam of light from an object 316, for example, a plant in a field is entered into the chamber 302 through the aperture 314. The reflected beam reaches the wedge prisms 304a-304b which in turn refract the reflected beam to direct it into the system 300. Following the prisms 304a-304b, the refracted beam reaches the beam splitter 306a. The beam splitter 306a splits the light intensity of the refracted beam into, for example, two separate beams, a first beam directed to the camera 308 and a second beam directed to the beam splitter 306b. The second beam is split yet again by the beam splitter 306b into, for example, two separate beams, a first beam directed to the condensing lens 310 and a second beam directed to the sensor 313. The LIDAR sensor 313 measures the distance to the object 316 by illuminating it with laser light and measuring the reflected light. The sensor 313 works sequentially in short proximity to the readings of the spectrometer 312 or parallel to the spectrometer 312.

The first beam, split by the beam splitter 306b, passes through the condensing lens 310 which condense the beam before it reaches the spectrometer 312. The spectrometer 312 analyzes the condensed beam's radiation and provides a spectrum of the reflected beam, while the camera 308 generates images of the object 316. The computer utilizes the data from the spectrometer 312 and the camera 308 to provide a hyperspectral cube of the object 316, while the data from sensor 313 is utilized to create a range map.

Upon different embodiments of the system 300, the position of the camera 308 and the sensor 313 is interchangable.

Figure 4:
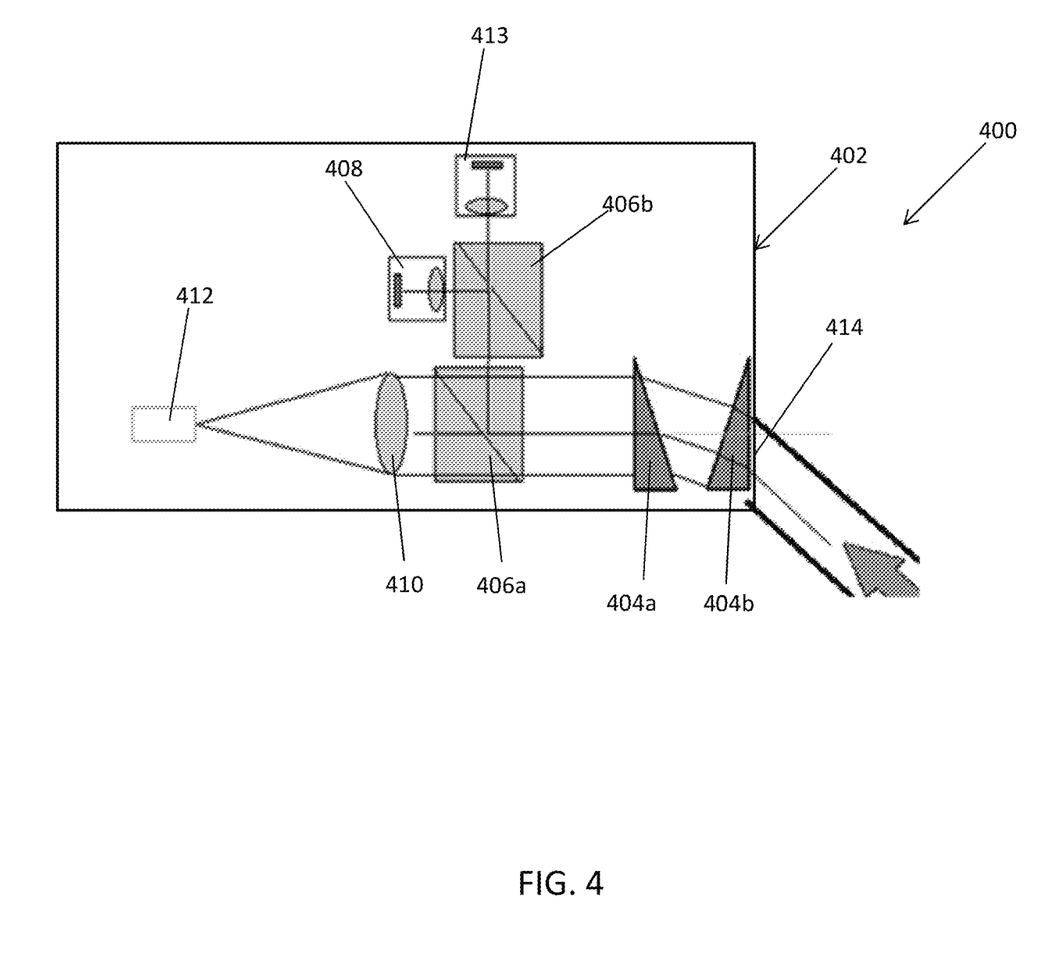
FIG. 4 is a side perspective view of the system according to yet another embodiment of the present invention.

FIG. 4 is a side perspective view of the system 400. The system 400 is similar in construction and operation to system 100, as detailed above, except where indicated.

The system 400 includes a chamber 402 enclosing, for example, two prisms 404a-404b, e.g. wedge prisms, two beam splitters 406a-406b positioned one on top of the other, a camera 408, a condensing lens 410, a spectrometer 412, for example, a point spectrometer and a sensor 413, for example, a light detection and ranging (LIDAR) sensor. The chamber 402 further includes an aperture 414 through which a reflected light field is entered into the system 400. The system 400 is linked to a computer (not shown). Upon different embodiments of the system 400, the position of the camera 408 and the sensor 413 may be interchanged.

A reflected beam of light from an object (not shown), for example, a plant in a field is entered into the chamber 402 through the aperture 414. The reflected beam reaches the wedge prisms 404a-404b which in turn refract the reflected beam to direct it into the system 400. Following the prisms 404a-404b, the refracted beam reaches the beam splitter 406a. The beam splitter 406a splits the light intensity of the refracted beam into, for example, two separate beams, a first beam directed to the condensing lens 410 and a second beam directed to the beam splitter 406b. The second beam directed to the beam splitter 406b is split yet again into, for example, two separate beams, a first beam directed to the camera 408 and a second beam directed to sensor 413, for example, light detection and ranging (LIDAR) sensor.

The first beam, split by the beam splitter 406a, passes through the condensing lens 410 which condense the beam before it reaches the spectrometer 412. The spectrometer 412 analyzes the condensed beam and provides a spectrum of the reflected beam, while the camera 408 generates images of the object. The computer utilizes the data from the spectrometer 412 and the camera 408 to provide a hyperspectral cube of the object, while the data from sensor 413 is utilized to create a range map.

Figure 5:
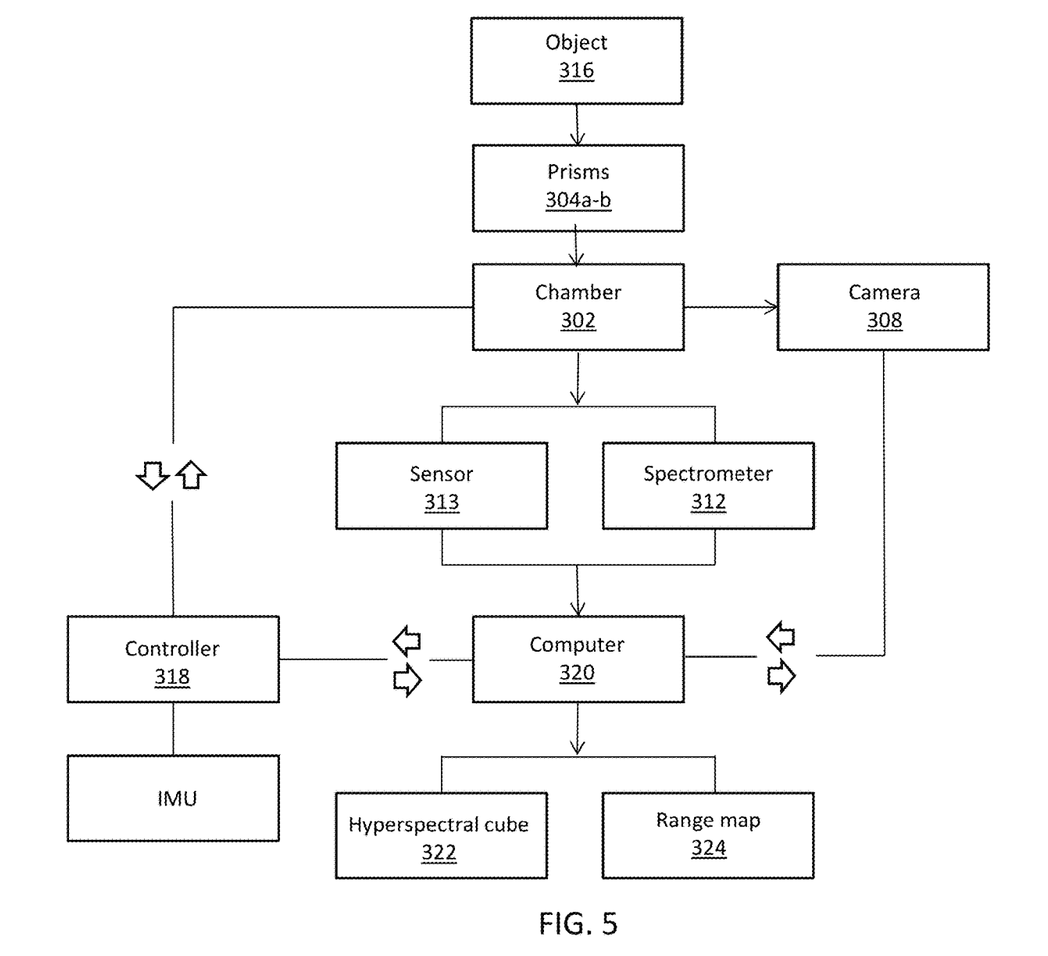
FIG. 5 is a flow chart of the systems of FIGS. 3 and 4.

FIG. 5 is a flow chart of the systems 300 and 400. The flow chart refers in numbers to system 300 but is also applicable for system 400 which is similar in construction and operation to system 300.

A reflected light field from the object 316 is directed by the prisms system 404a-404b and transferred through the chamber 302. In the chamber 302, the light is split into, for example, two separate beams, a first beam directed to the camera 308 and a second beam directed to the spectrometer 312 and the LIDAR sensor 313. The motion of the system 300 to compensate external motion such as UAV vibration is controlled by a controller 318 connected to an Inertial Measurement Unit (IMU) or other feedback orientation sensors. The chamber motion may also be estimated from changes in the instantaneous field of view of the camera 308.

The controller 318 execute the movement of the prisms 304a-304b according to the scanning plan. Prisms' motion feedback may be controlled through motion indicator such as encoders and may also be estimated from changes in the instantaneous field of view of the camera 308.

The returned information of the camera 308, the spectrometer 312 and the LIDAR sensor 313 are processed on the computer 320 to gain a hyperspectral cube 322 and a range map 324.

EXAMPLES

The following examples are not meant to limit the scope of the claims in any way. The following examples are put forth so as to provide those of ordinary skill in the art with a complete disclosure and description of how to make and use the described invention, and are not intended to limit the scope of the invention, nor are they intended to represent that the experiments below are all or the only experiments performed.

Example 1—Lab Prototype

Figure 6:
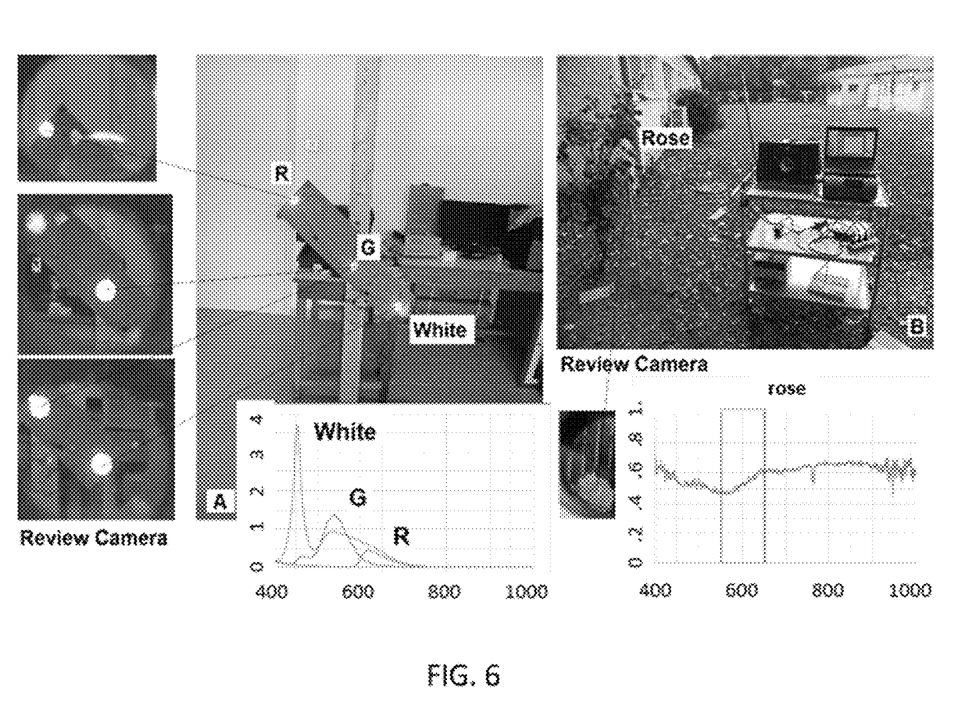
FIG. 6 is a lab prototype of the system according to an embodiment of the present invention.

Experimental results of a lab prototype are presented in FIG. 6. FIG. 6 presents indoor measurements of assembly of 3 white light-emitting diodes (LED) with filters, red (R), green (G) and white without a filter. The RGB images of the review camera are presented on the left while the measured spectrum is presented below. The field of view of the review camera is wider than that of the spectrometer. While measuring a specific LED, other LEDs may be seen in the review camera without affecting the spectrometer readings. FIG. 6 presents outdoor measurements of a rose flower. The image of the rose flower through the review camera and the rose spectrum are presented side by side. Integration time of the spectrometer was 34 ms. This integration time allows coverage of 250 square meters when the system is mounted on a 20 m hydraulic post and tilted in 45 degrees, with a ground sample distance (GSD) of 22 cm, or coverage of 5000 square meters with a GSD of 1.1 m when the system stares downwards from 80 meters.

Example 2—System for Hyperspectral Sampling

Figure 7:
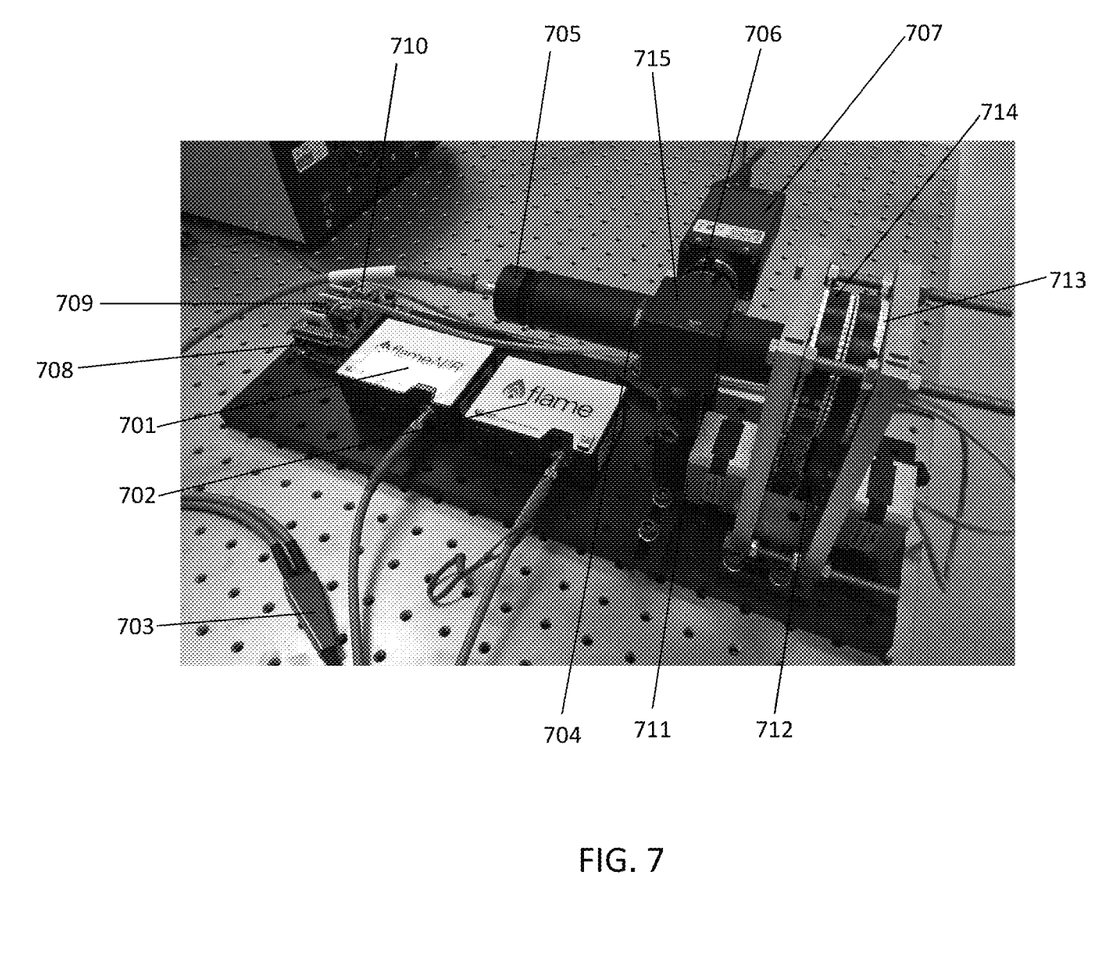
FIG. 7 is an implementation of a system according to an embodiment of the present invention assembled on a moving platform.

FIG. 7 presents an implementation of a system for hyperspectral sampling of crop assembled on a hydraulic post. The system consists of the components presented in Table 1 below.

TABLE 1

List of components

| # | Name and description | Qty |
|---|---|---|
| 701 | Ocean Optics Flame | 1 |
| 702 | Ocean Optics Flame NIR | 1 |
| 703 | Ocean Optics bifurcated fiber | 1 |
| 704 | Thor Labs plano convex lens, f = 75 mm | 1 |
| 705 | Thor Labs sma 905 fiber terminal and focus tube | 1 |
| 706 | Thor Labs mounted ND filter | 1 |
| 707 | Allied Vision Manta RGB camera (subject to change) | 1 |
| 708 | Arduino Uno R3 microcontroller | 1 |
| 709 | GRBL v1.3 CNC shield | 1 |
| 710 | Polulu A4988 stepper motor driver | 2 |
| 711 | MENA 17 stepper motor, 200 steps per revolution | 1 |
| 712 | GT3 belt pully 16 T | 2 |
| 713 | GT3 belt pully 72 T | 2 |
| 714 | GT3 belt | 2 |
| 715 | Edmund Optics 50:50 beam splitter cube | 1 |
| — | Edmund Optics 15° wedge prism (internal) | 2 |
| — | 12 V DC power supply (not shown) | 1 |
| — | USB hub (not shown) | 1 |

Example 3—Hyper Spectral Results

Figure 8A:
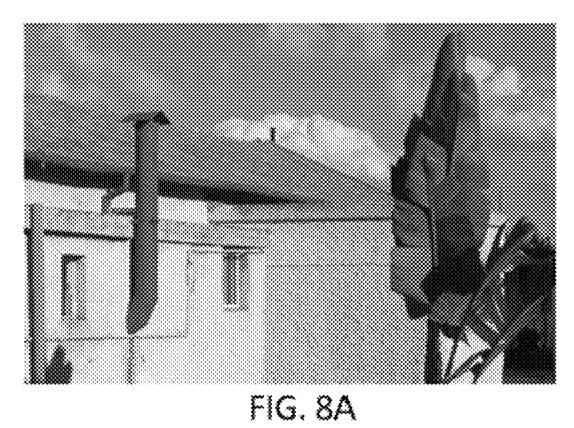
FIGS. 8A-B present hyper spectral results using the lab prototype of FIG. 6.
Figure 8B:
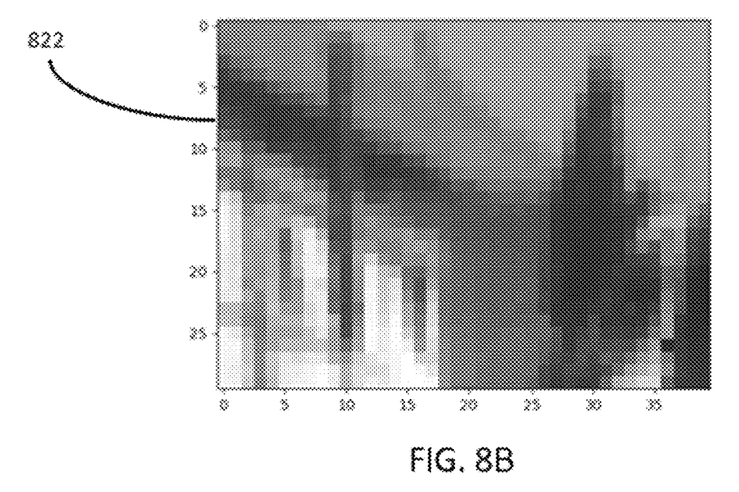

FIGS. 8A-8B present hyperspectral results using the lab prototype of Example 1 while using only a point spectrometer. FIG. 8A presents a standard image of an ordinary building taken by an ordinary RGB camera. FIG. 8B is a pseudo RGB image composed of 3 layers of a hyperspectral cube 822 out of more than 3000 layers. The measurements are done approximately 20 m from the building.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A scanning system comprising:
   a chamber configured for receiving reflected light from an object, said chamber comprising
      a first prism and a second prism configured for refracting said reflected light;
      at least one beam splitter configured for splitting said reflected light into a first beam and a second beam;
      a camera configured for receiving said first beam so as to provide images of said object;
      a condenser lens configured for condensing said second beam; and,
      a spectrometer configured for receiving the condensed second beam and provide a spectrum analysis of said second beam;
   a controller; and
   a particular computer;
   wherein
      (a) the controller executes a movement of the first and second prisms in accordance with a scanning plan stored on the computer,
      (b) the system is calibrated to correct for transmission losses such that a measurement at a point $(\theta, \Omega, Z)$ is corrected according to a formula $\hat{I}(\theta, \Omega, Z) = F(I_{measure}(\theta, \Omega, Z))$, wherein $\hat{I}(\theta, \Omega, Z)$ is an estimator of radiation, $T(\theta, \Omega, Z)$ is a system transmission, and $I_{measure}(\theta, \Omega, Z)$ is a system measurement in that point; and
      (c) the particular computer is configured to process information comprising the scanning plan, prism motion feedback from the controller, said images, and said spectrum analysis to provide a hyperspectral image cube.

2. The system of claim 1 additionally comprising a sensor for measuring a distance from said object.

3. The system of claim 2 wherein, said sensor is a light detection and ranging (LIDAR) sensor.

4. The system of claim 3 wherein, said light detection and ranging (LIDAR) sensor provides a range map.

5. The system of claim 1 wherein, said camera is an RGB camera.

6. The system of claim 1 wherein, said spectrometer is a point spectrometer.

7. The system of claim 1 wherein, said first prism and said second prism are each connected to a rotating mechanism to allow an individual rotation of each prism around its axis.

8. The system of claim 7 wherein, said rotating mechanism is operated manually.

9. The system of claim 7 wherein, said rotating mechanism is operated by the controller.

10. The system of claim 1 additionally comprising a filter configured for limiting illumination.

11. The system of claim 1 additionally comprising an integral radiation meter configured for monitoring radiation from external sources.

12. The system of claim 1 wherein, said system is mounted on one of a tripod, a post, and a tower.

13. The system of claim 1 wherein, said system is mounted on an unmanned aerial vehicle (UAV).

14. The system of claim 13 wherein, said system is stabilized by a gimbal set to prevent hovering errors.

15. The system of claim 1 wherein, said camera and said spectrometer are aligned so as to allow accurate identification of an exact location of spectrometer's measurements in the image cube.

* * * * *